Nov. 5, 1974   L. S. MERRILL, JR   3,846,279

METHOD FOR MAKING AND SLURRYING WAX BEADS

Filed Sept. 18, 1972

United States Patent Office 3,846,279
Patented Nov. 5, 1974

3,846,279
METHOD FOR MAKING AND SLURRYING WAX BEADS
Lavaun S. Merrill, Jr., Englewood, Colo., assignor to Marathon Oil Company, Findlay, Ohio
Filed Sept. 18, 1972, Ser. No. 289,918
Int. Cl. F17d 1/16
U.S. Cl. 208—93                                  40 Claims

ABSTRACT OF THE DISCLOSURE

Hydrocarbon mixtures (e.g. "waxy" crude oils) are transported as a slurry by first fractionating the mixture into at least a relatively low pour point fraction and a relatively high pour point fraction, thereafter congealing at least a portion of the relatively high pour point fraction by introducing and dispersing it into a tower having a continuous stream of water flowing countercurrent to the introduction of the high pour point fraction and wherein the water in at least the upper portion of the tower is at a sufficient temperature to congeal the dispersed, rising high pour point fraction, permitting the resulting congealed particles to move upwardly through the tower and pass through an interface within the tower, the interface being the juncture of water and the relatively low pour point fraction being introduced into the top portion of the tower, and withdrawing at least a portion of the resulting slurry at above the interface and transporting the slurry, preferably in a conduit, at a temperature below about the solution temperature of the congealed particles. Concentration of the congealed particles within the slurry is preferably about 10% to about 50% by weight. Also, the average diameter of the congealed particles is preferably about 0.1 to about 5 mm. (millimeters).

BACKGROUND OF THE INVENTION

Field of the Invention

This invention relates to transporting viscous hydrocarbon mixtures, e.g. crude oil, by first fractionating the hydrocarbon mixture into at least two fractions, congealing one fraction and then combining the congealed fraction with a more fluid fraction and transporting same preferably in a conduit. Congelation is effected in a tower having a continuous stream of water flowing therethrough to congeal the fraction.

Description of the Prior Art

Pumping viscous hydrocarbon mixtures at temperatures below the pour point thereof is very difficult. Heat transfer methods and chemical agents to improve fluid flow properties have been studied. Pour point depressers have been tried as well as diluents to improve the pumpability. Visbreaking agents have also been tried but with little success. In addition, the oil has been congealed, then suspended in water and the combination pumped at temperatures below the pour point of the crude oil.

Examples of patents representative of the art include:

Kells in U.S. 271,080 separates the wax from crude oils by pumping the crude oil, e.g. in small streams or jets, into the bottom of a tank containing a brine at a temperature sufficiently low to congeal the wax. The congealed wax is recovered in the brine.

Persch in U.S. 1,454,485 blasts air under pressure into crude oil to form an emulsion of air and oil to increase the fluidity of the oil.

Oberfell et al. in U.S. 2,526,966 teaches transporting viscous crude oils by removing the light hydrocarbons (including straight run gasoline), hydrogenating the residue to increase the fluidity thereof and then combining the hydrogenated product and the light hydrocarbons and pumping the mixture.

Chilton et al. in U.S. 2,821,205 forms a film of water on the interior wall of the pipe to improve the pumpability of viscous oil. In addition, a light petroleum or condensed casing-head gas can be admixed with the crude oil to reduce the viscosity. Agents such as phosphates and polyphosphates can be added to increase the water's ability to selectively adhere to the steel pipe and to displace any oil from the surface of the pipe without forming an emulsion.

Scott et al. in U.S. 3,269,401 teach facilitating flow of wax-bearing oil in a pipeline by dissolving in the oil, at superatmospheric pressure and while above its pour point, a gas such as $N_2$, $CO_2$, flue gas, and hydrocarbons containing less than 3 carbon atoms. The "gas becomes associated in some way with the wax crystals and prevents the precipitated wax from agglomerating to form strong wax structures". Also, the gas collects on the surfaces of the wax particles, especially the larger ones, to form films of gas envelopes which isolate the particles from one another and prevent the wax particles from combining.

Kane in U.S. 3,425,429 transports viscous crude oils by forming an oil-in-water emulsion, the water containing a nonionic surfactant.

Watanabe in U.S. 3,468,986 forms spherical particles of wax by melting the wax, then dispersing same in a nonsolvent liquid (e.g. water) maintained at a temperature above the solidification temperature of the wax and thereafter cooling the dispersion to solidify the dispersed droplets into discrete solid particles. The particles can be coated with finely divided solids such as calcium carbonate, etc. Watanabe teaches that it is known in the art to disperse waxy particles by molding, prilling, spray drying, extruding, etc.

Titus in U.S. 3,527,692 transports crushed oil shale in a solvent slurry. The oil shale is first comminuted to a size of 140-325 mesh and then suspended in a solvent such as crude oil, retorted shale oil, or a fraction thereof.

Allen in U.S. 3,548,846 teaches transporting waxy crude oils by incorporating propane or butane within the crude oil.

Vairogs in U.S. 3,618,624 transports viscous crude oils by incorporating a miscible gas, e.g. $CO_2$, methane, ethane, into the crude to reduce the viscosity thereof.

The art has also used heat, e.g. tracer lines and large heat exchangers placed intermittently along the pipeline, to maintain the crude oil above its pour point and thus facilitate pumping of same. The main disadvantage of these methods is the crude oil tends to "set-up" during shutdowns.

This technology, except for heat transfer systems and crude oil-water suspension systems, has generally proven to be commercially unattractive.

SUMMARY OF THE INVENTION

Applicant's invention is the fractionation of a hydrocarbon mixture, e.g. high pour point crude oil(s), into at least two fractions, a relatively low pour point fraction and a relatively high pour point fraction. At least a portion, preferably at least 50% and more preferably substantially all of the relatively high pour point fraction is then introduced into the bottom of a tower wherein a continuous stream of water flows countercurrent to the introduced high pour point fraction. Sufficient turbulence is induced into the high pour point fraction before it comes in contact with water within the tower or as the fraction is introduced into the water within the tower to cause the fraction to disperse into discrete particles having an average diameter of about 0.05 to about 20 mm. The particles migrate upwardly in the tower and are congealed by water flowing countercurrent and at sufficient temperature to congeal the particles. The congealed particles are permitted to pass through an interface in the top portion of the tower, the interface obtained from the water and the relatively low pour point fraction being introduced into the top portion o fthe tower. A portion of the slurry above the interface is withdrawn from the tower, and transported, preferably in a pipeline, at a temperature below about the solution temperature of the congealed particles.

PREFERRED EMBODIMENTS OF THE INVENTION

Figure 1:
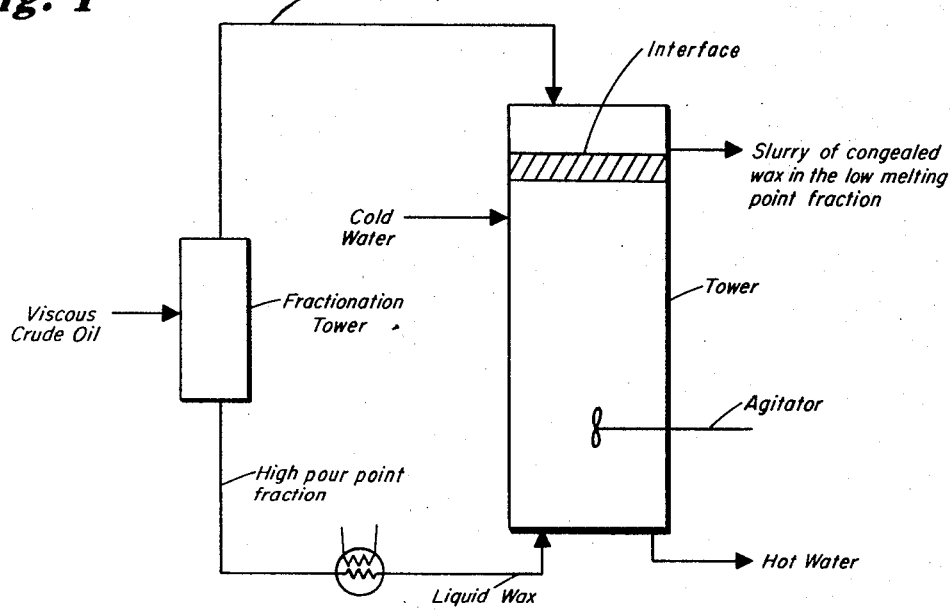
FIG. 1.—Viscous crude oil enters a fractionation tower wherein the crude is fractionated into a low pour point fraction and a high pour point fraction. The high pour point fraction enters a heat exchanger (at this point identified as liquid wax) and thereafter enters the bottom of the tower where it comes in contact with water flowing countercurrent to the introduction of the liquid wax. The water exits from the tower as hot water, preferably at about the same temperature as the liquid wax entering the bottom of the tower. An agitator imparts sufficient turbulence to water within the lower portion of the tower to facilitate dispersion of the liquid wax into discrete particles having an average diameter of about 0.1 to about 5 mm. As the dispersed liquid wax progresses upwardly in the tower, it is congealed by incoming cold water. The congealed particles rise to an interface obtained by the water and the low pour point fraction (entering the top of the tower) and form a slurry in the low pour point fraction. A portion of the slurry above the interface is removed from the tower. Thereafter, the slurry is transported, preferably in a pipeline, at an average temperature below about the solution temperature of the congealed wax in the low pour point fraction.
Figure 2:
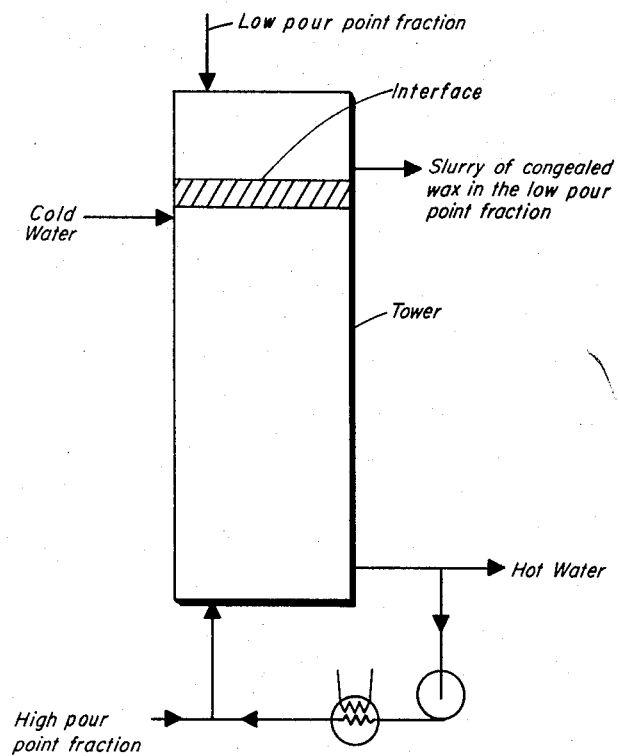
FIG. 2—Illustrates a preferred embodiment of the invention. The high pour point fraction (in the liquid state) is mixed with hot water before the fraction enters the bottom of the tower. The hot water leaving the tower is pumped through a heat exchanger (optional) before it comes in contact with the high pour point fraction, the two phase flow of the hot water and the fraction are under sufficient turbulent flow to facilitate dispersing the fraction into discrete particles within the hot water. The large surface tension forces between the high pour point fraction and the water facilitate dispersing the fraction into discrete particle sizes. Cold water enters the top portion of the tower and hot water leaves the bottom of the tower. The dispersed fracion moves upward through the tower due to specific gravity differential and is congealed as it progresses up into cooler water within the tower. A low pour point fraction enters the top of the tower to maintain a hydorcarbon continuous phase and to form an interface in the top portion of the tower with the water. The congealed particles pass through the interface and form a slurry with the low pour point fraction. A portion of the slurry is withdrawn from the tower and transported in a conduit at a temperature below the solution temperature of the congealed particles.

Hydrocarbon mixtures having an average pour point below the seasonably ambient temperature of the transportation system, e.g. a pipeline, are particularly applicable with this invention. Examples of hydrocarbon mixtures include crude oil, shale oil, tar sand oil, fuel oil, gas oil, like hydrocarbon mixtures and mixtures of two or more of the same type or different hydrocarbon mixtures. Crude oils are particularly useful with this invention and especially those classified as "waxy" crude oils. Examples of the latter include crude oils which exhibit a "waxy gell" appearance at seasonably ambient temperature which contain about 1% to about 80% wax (wax is defined as the precipitate which forms after one part of crude oil is dissolved in 10 parts of methyl ethyl ketone at about 80° C. and the mixture chilled to −25° C.) and preferably those which have an average pour point above the average minimum temperature of the transporting system, e.g. a pipeline. Examples of average pour points of crude oils particularly useful with this invention include about −10 to about 200 and preferably about 0 to about 150° F.

The hydrocarbon is first fractionated into at least two fractions, an overheads fraction which has a relatively low pour point (also identified as having a density and viscosity at a given temperature lower than the original hydrocarbon) and a bottoms fraction which has a relatively high pour point (also identified as having a density and viscosity at a given temperature above that of the original hydrocarbon mixture). The bottoms fraction or the relatively high pour point fraction can be any portion of the hydrocarbon mixture but can be about 1% to about 80% and preferably about 20% to about 70% and more preferably about 30% to about 60% by weight of the original hydrocarbon mixture. It is to be understood that fractions other than the bottoms and overheads fractions can be obtained and these fractions used in other processing streams.

Fractionation can be accomplished at atmospheric pressure, sub or superatmospheric pressure and at low and high temperatures by processes such as distillation, solvent extraction, membrane fractionation, crystallization, or any process which separates the hydrocarbon mixture into at least two fractions. Optionally, an equivalent amonut of up to 50%, preferably up to 42% and more preferably up to 33% by volume of the high pour point fraction can be cracked (by thermal, hydrogenation, catalytical or combinations thereof) during fractionation or before congelation.

The low pour point fraction should have a pour point at least 1° and preferably at least about 5° F. and more preferably at least about 10° F. below the average temperature of the transporting system, such as a pipeline or a combination of pipeline and tank battery.

The high pour point fraction should be sufficiently dispersed in the water phase of the tower so that the resulting congealed particles have an average diameter in the water phase of the tower of about 0.05 to about 20 or more mm. and preferably about 0.1 to about 5 mm. and more preferably about 0.5 to about 3 mm. The particles are preferably spherical and can be of substantially uniform or random diameter sizes.

Congelation

It is necessary that the high pour point fraction be in the liquid state and be finely dispersed, i.e. broken up into small particles, before congelation. Such can be effected, e.g. by mixing the high pour point fraction with an immiscible liquid having a large interfacial tension with respect to the high pour point fraction, e.g. hot water. However, the liquid, high pour point fraction can be dispersed into the bottom of the tower without having been admixed with water—with this embodiment it is preferred that the fraction immediately come in contact with hot water in turbulent flow within the tower to facilitate dispersion. Turbulency can be imparted to the water by external and/or internal methods to the tower, e.g. by impeller, by pumping liquids, sonic vibration, or like means. In any case, the high pour point fraction should be in liquid state and should be sufficiently dispersed so that the desired shape and sizes of the congealed particles are obtained. Congealing as used herein includes solidification, crystallization, making into a consistency like jelly, etc.

Introduction of the high pour point fraction into the tower can be effected by pumping the fraction through a nozzle(s) into the bottom of the tower, the nozzle(s) can optionally be rotating and can optionally have a perforated plate(s) mounted in the nozzle. Extrusion is also effective to disperse the fraction. In general, any method which can effectively disperse the fraction into the tower is effective with this invention.

The high pour point fraction is preferably about 1 to about 100° F. and more preferably about 10 to about 50° F. above its average congelation temperature as it is dispersed for congelation.

Water entering the tower is preferably at about ambient temperature and is more preferably about 10 to about 50° F. below the average congelation temperature of the high pour point fraction. Where hot water is combined with the high pour point fraction before coming into contact with water within the tower, the temperature of the combination is preferably at least about 5° and more preferably at least about 30° F. above the congelation temperature of the dispersed, high pour point fraction. However, where the high pour point fraction is not mixed with hot water before it enters the tower, the water exiting the tower is preferably at or about the same temperature as the high pour point fraction entering the tower—such facilitates dispersion of the fraction. Of course, there can be a large temperature differential from the cold water entering the tower to the water exiting the tower; but, the exiting water can be relatively close to ambient temperature when large flow rates of water are used. It is preferred that the temperature differential be large and more preferably that the gradient of the differential be small.

Where it is desired to obtain a more dense congealed fraction and/or a more "rigid" congealed fraction, i.e. a solid particle, the temperature differential of incoming to exiting water is preferably ambient or a lesser temperature (down to the freezing temperature of the water) to a temperature about equal the incoming, ungealed high pour point fraction. Of course, desired densities and different degrees of rigidity can be obtained by varying the temperature differential of water entering and exiting the tower and to gradient of the differential.

Where the hot water is admixed with the high pour point fraction before the latter enters the tower, temperature of the mixture is preferably at least about 10° F. and more preferably at least about 30° F. above the congelation temperature of the dispersed fraction. Examples of useful temperature ranges for a crude oil having a pour point of about 100–120° F. are about 110° to about 212° F. and preferably about 130° to about 160° F. The mixture is preferably under turbulent flow, the turbulency preferably sufficient to cause the high pour point fraction to be dispersed to an average diameter of about 0.05 to about 20 mm., Reynolds numbers of about 3000 to about 1,000,000 are useful to define the desired turbulency.

A surfactant can be incorporated into the high pour point fraction before it is congealed, e.g. it can be admixed with the fraction before or as it enters the tower. Volume amounts of about 0.001 to about 20% and preferably about 0.01 to about 10%, and more preferably about 0.1 to about 1% by volume, based on the fraction, are useful. The surfactant should have sufficient oleophilic property to solubilize into or act like it is miscible with the fraction. It is postulated that the surfactant molecules tend to orient their hydrophilic portion radially at the particle surface. Theoretically, this happens as the congealed particles are formed, imparting a more hydrophilic property to the particle. Examples of useful surfactants include fatty acids (e.g. containing about 10 to about 20 carbon atoms) and preferably monovalent cation containing salts thereto. Sorbitan monolaurate is an example or a useful surfactant. Preferably the surfactant is a petroleum sulfonate preferably having a monovalent cation, e.g. Na+, and preferably having an average equivalent weight of about 200 to about 600 and more preferably about 250 to about 500 and most preferably about 350 to about 420.

Due to the density differential between the congealing or the congealed fraction and the tower water, the congealed fraction moves upwardly to the top portion of the tower. At the top portion of the tower, there is formed an interface between the low pour point fraction being introduced into the top portion of the tower and water within the tower. Theoretically, all of the congealed particles pass through the interface and form a slurry with the low pour point fraction—such an action displaces any water adhering to the surface of the congealed particles.

The displaced water settles back into the water phase. The congealed particles tend to accumulate at the interface and there may be some particles still within the water phase due to the particles "stacking" up, i.e. the particles within the water phase tend to buoy up the particles immediately above them.

Preferably, the slurry of congealed fraction and the low pour point fraction is removed from the interface at an elevation above the interface of the low pour point fraction and the tower water. Such is desired to keep water out of the slurry. However, minor amounts of water, e.g. about 0.1 to about 5% or more by volume may be carried over into the slurry without detrimental effect. A liquid diluent, such as a straight-run gasoline, reservoir condensate or like hydrocarbon, can be admixed with the low pour point fraction before, during or after the slurrying operation—any diluent which is miscible with the low pour point fraction and which preferably has a pour point below the minimum temperature of the transporting system is useful with this invention.

The low pour point fraction entering the tower is preferably at least about 5° and more preferably at least about 30° and most preferably at least about 70° F. below the solution temperature of the congealed high pour point fraction. Solution temperature as used herein is defined as that temperature at which substantially all of the congealed fraction is placed into solution of the low pour point fraction.

During transportation of the hydrocarbon mixture, the average minimum temperature of the slurry preferably does not exceed the solution temperature of the congealed fraction. That is, during at least the major initial length of the pipeline, the temperature of the slurry should not exceed the solution temperature of the congealed fraction. But, if a temperature increase is realized while transporting the slurry, e.g. through the conduit, such is not detrimental as long as the increase is positive. However, when the temperature starts cycling, e.g. about 30° F. above and below the solution temperature of the congealed fraction, then adversities may be realized. Of course, temperature cycling at the terminal end of the pipeline may occur without significantly affecting the pumpability of the slurry.

During or after congelation, the particles can be coated with gases, solid materials, or other desired agents to inhibit agglomeration, to permit high slurry temperatures during transportation, etc. Examples of solid materials include those disclosed in U.S. 3,468,986 to Watanabe. Examples of useful solid materials include inorganic and organic salts of the metals of Group II, III, IV–A, V, VI, VII, and VIII of the Periodic Table; synthetic resins such as cellulose acetate, polystyrene, polyethylene, polyvinyl acetate, and like resins; and other materials such as clay (e.g. bentonite), kaolin, Fuller's earth and other aluminum silicates, limestone, etc. Calcium carbonate is a preferred coating material. Examples of useful gases include air, $CO_2$, lower hydrocarbons containing up to 4 carbon atoms, natural gas and like compounds.

The pH of the water as well as other conditions of the water and environment can be designed to facilitate sorbing the solid material or gas onto the congealed particle. The coating can be applied by contacting the congealed particle with a hydrous or anhydrous spray or bath or a combination thereof. When a water bath is used, the gas or solid material can be present in concentrations of about 10 to about 200,000 p.p.m. and preferably about 100 to about 100,000 p.p.m. Of course, the solubility of the gas or solid material in the water bath will govern the concentration. It is desired that up to a monomolecular layer of the gas or solid material be deposited onto the congealed particles. The concentration of congealed fraction in the slurry is preferably about 1% to about 80% and more preferably about 5% to about 55% and most preferably about 10% to about 50% by weight. During the slurrying operation, the temperature of the overheads fraction is preferably about 30° below to about 30° F. above and more preferably about 15° below to about 15° F. above the minimum, seasonably ambient temperature of the transportation system. Also, it is preferred that the temperature of the low pour point fraction during slurrying be about 30° F. and more preferably about 70° F. below the solution temperature of the congealed high pour point fraction.

Transportation of the slurry

The slurry can be transported in bulk, e.g. tank car, tank truck, tank trailer, tank barge, tanker or like means, but is preferably transported in a conduit, such as a pipeline. Of course, the conduit or pipeline system will have tank batteries, i.e. collection or holding tanks, associated with it.

The slurry can be transported under laminar, transitional (e.g. at Reynolds number of about 2,000 to about 4,000) or turbulent flow conditions in the conduit. Turbulent flow conditions may be preferred where it is desired to maintain the congealed particles in a "homogeneous" dispersed state.

The slurry is preferably transported in a conduit wherein the average maximum temperature of the conduit in at least its major initial length is below the average solution temperature of the congealed fraction in the low pour point fraction. The average maximum temperature of the conduit is preferably at least about 1° F. below and more preferably at least about 5° F. below the average solution temperature of the congealed fraction within the slurry. In addition, the average temperature of the conduit should not be below the average pour point of the low pour point fraction and preferably is at least about 1° F. and more preferably at least about 5° F. above this pour point.

A gas miscible with the low pour point fraction can be admixed with the slurry to facilitate pumpability. The gas is preferably immiscible with the congealed fraction. Examples of such gases include $CO_2$, hydrocarbons containing less than about 3 carbon atoms, $N_2$, flue gas, and like gases. The gas can be injected into the slurry under conditions such that the gas is present in concentrations greater than saturation conditions at atmospheric conditions. The slurry is preferably saturated with $CO_2$ at superatmospheric pressures.

Chemical agents to facilitate suspension of the congealed fraction, e.g. high molecular weight polymers, can be added to the slurry. Also, viscosity reducing agents, pour point reducers, drag reduction agents can be admixed with the slurry to impart desired properties.

Working Examples

EXAMPLE I

A glass column 2" inside diameter and 48" long is fitted with the necessary equipment to accomplish introduction of the following fluids. A crude oil having a pour point of 117° F. is distilled such that 42% is taken as overheads fraction (low pour point fraction) and 58% is taken as bottoms fraction (high pour point fraction). 2,000 cc./hr. of the bottoms fraction at 160° F. is combined with 16,000 cc./hr. of water recycled from the column and heated to 160° F. and the combination fed into the bottom of the column through a tubing (inside diameter =1/16"). Water at 70° F. enters the column at about 8" from the top of the column and 13,000 cc./hr. of water at 130° F. leaves the bottom of the column. The bottoms fraction is dispersed into the bottom of the column and congealed particles having an average diameter of about 0.5–2 mm. are obtained. Flow rate of water within the column is such that laminar flow is obtained. The overheads fraction at 70° F. and at a rate of 1,450 cc./hr. is introduced into the top of the column, an interface is formed between the overheads fraction and the water within the column. A slurry containing about 58% of the congealed spherical particles is withdrawn from the column at a point above the interface and is thereafter transported in about 28 ft. of pipe having an inside diameter of about ½".

EXAMPLE II

A crude oil having a pour point of about 135° F. is distilled at atmospheric pressures into an overheads fraction (42% by volume) and a bottoms fraction (59% by volume). The bottoms fraction is heated to 180° F. and 3,200 cc./hr., is mixed with 6,300 cc./hr. of water recycled from the bottom of the water column and heated to an average temperature of 190° F.—the combination is under turbulent flow. The aqueous bottoms fraction is introduced through a tube having an inside diameter of 0.083" into the bottom of a column identical with that described in Example I. Water at 75° F. enters the column at about 10" from the top of the column, and 13,000 cc./hr. of water at 130° F. leaves the bottom of the column. The water within the column has a velocity of about 0.2 cm./sec. The average congelation temperature of the bottoms fraction being introduced into the column is about 120° F. The overheads fraction, at 70° F. and at a rate of 2300 cc./hr., is introduced into the top of the column along with about 900 cc./hr. of straight-run gasoline (at 70° F.). An interface is formed about 8" from the top of the column between the overheads fraction/gasoline and the water within the column. About 6400 cc./hr. of slurry composed of about 50% of congealed high pour point fraction having an average diameter of about 0.5–2 mm. is withdrawn at about 2" above the interface within the column.

The slurry is transported through 28 feet of ½" pipe in a closed loop through a centrifugal pump. The average temperature of the slurry within the pipe is about 70° F. After 150 complete cycles through the loop, the slurry is examined and it is observed that the particles are still intact and not even a minor portion are in solution.

It is not intended that the above examples limit the invention in any way. Rather, all equivalents obvious to those skilled in the art are intended to be equated within the spirit of the invention as exemplified by the specification and appended claims.

What is claimed is:

1. A process for transporting a hydrocarbon mixture as a slurry, the process comprising:
    (1) fractionating the hydrocarbon mixture into at least a relatively low pour point fraction and a relatively high pour point fraction,
    (2) introducing at least a portion of the relatively high pour point fraction into the bottom of a tower having a continuous stream of water flowing countercurrent to the introduction of the relatively high pour point fraction and wherein the water enters the top portion of the tower a temperature at least about 5° F. below the congelation temperature of the relatively high pour point fraction,
    (3) imparting sufficient turbulence to the high pour point fraction to cause it to be dispersed into the water phase within the tower and permitting the dispersed particles of the fraction to stay in contact with the water for sufficient time to substantially congeal the fraction,
    (4) permitting the resulting congealed particles to move upwardly through the tower and pass through an interface in the tower, the interface being the junction between the relatively low pour point fraction being introduced into the top of the tower and the water within the tower,
    (5) withdrawing at least a portion of the resulting slurry of the congealed particles in the low pour point fraction at about the interface and thereafter transporting the slurry at a temperature below about the solution temperature of the congealed particles in the low pour point fraction.

2. The process of Claim 1 wherein the hydrocarbon mixture is a "waxy" crude oil.

3. The process of Claim 2 wherein the "waxy" crude oil has an average wax concentration of about 1 to about 80% by weight.

4. The process of Claim 2 wherein the "waxy" crude oil has an average pour point above about the average seasonably minimum temperature of the transportation system.

5. The process of Claim 1 wherein the hydrocarbon mixture is a crude oil having an average pour point of about −10° to about 200° F.

6. The process of Claim 1 wherein the transportation system is a conduit.

7. The process of Claim 1 wherein the relatively high pour point fraction is equivalent to about 20 to about 70% of the weight of the hydrocarbon mixture.

8. The process of Claim 1 wherein slurrying is effected at a temperature at least about 5° F. below the solution temperature of the congealed fraction in the low pour point fraction.

9. The process of Claim 1 wherein the relatively high pour point fraction is congealed at a temperature at least about 5° F. below its pour point.

10. The process of Claim 1 wherein an equivalent amount of up to about 50% by weight of the high pour point fraction is cracked before it is congealed.

11. The process of Claim 1 wherein the average diameter of the congealed particles is about 0.05 to about 20 mm.

12. The process of Claim 1 wherein the flow rate of water within the tower is regulated such that the water exiting the tower is at about the same temperature as the relatively high pour point fraction entering the tower.

13. The process of Claim 1 wherein a liquid diluent miscible with the low pour point fraction is admixed with the low pour point fraction before, during or after the slurrying.

14. The process of Claim 1 wherein the relatively high pour point fraction is introduced into the bottom of the tower under turbulent flow.

15. The process of Claim 1 wherein the incoming water to the tower contains about 10 to about 200,000 p.p.m. of a salt(s) of a metal(s) selected from Groups II, III, IV-A, V, VI, VII, and VIII of the Periodic Table.

16. The process of Claim 15 wherein the salt is calcium carbonate.

17. The process of Claim 1 wherein the average diameter of the congealed particles is about 0.1 to about 5 mm.

18. A process of transporting a "waxy" crude oil in a conduit as a slurry, the process comprising:
    (1) fractionating the crude oil into at least a relatively low pour point fraction and a relatively high pour point fraction,
    (2) combining at least a portion of the relatively high pour point fraction with sufficient water such that the high pour point fraction is dispersed within the water and introducing the resulting mixture at a temperature above the congelation temperature of the relatively high pour point fraction into the bottom of a tower having a continuous stream of water flowing counter-current to the introduction of the relatively high pour point fraction and wherein the water entering the tower is at a temperature at least 5° F. below the congelation temperature of the relatively high pour point fraction,
    (3) permitting the dispersed high pour point fraction to stay in contact with the water for sufficient time to substantially congeal the relatively high pour point fraction,
    (4) permitting the resulting congealed particles to move upwards in the tower and pass through an interface within the upper portion of the tower, the interface being the juncture of water within the tower and a continuous stream of the relatively low pour point fraction being introduced into the top portion of the tower, and
    (5) withdrawing at least a portion of the resulting slurry of the congealed particles in the low pour point fraction and transporting the slurry in a conduit at a temperature below about the solution temperature of the congealed particles in the low pour point fraction.

19. The process of Claim 18 wherein the average diameter of the congealed particles is about 0.05 to about 20 mm.

20. The process of Claim 18 wherein the pour point of the "waxy" crude oil is about 0 to about 150° F.

21. The process of Claim 18 wherein the relatively high pour point fraction is equivalent to about 20% to about 70% by weight of the crude oil.

22. The process of Claim 18 wherein a portion of the crude oil is cracked during fractionation.

23. The process of Claim 10 wherein fractionation is effected by distillation.

24. The process of Claim 18 wherein an oleophilic surfactant is admixed with the high pour point fraction before it is congealed.

25. The process of Claim 24 wherein about 0.001 to about 20% by volume, based on the high pour point fraction, of surfactant is admixed.

26. The process of Claim 18 wherein a gas miscible with the low pour point fraction is admixed with the slurry either before or during transporting of the slurry.

27. The process of Claim 26 wherein the gas is $CO_2$.

28. The process of Claim 18 wherein the congealed particle is substantially coated with a solid material.

29. The process of Claim 28 wherein the solid material is an inorganic salt(s) and/or an organic salt(s) of a metal(s) of Groups II, III, IV-A, V, VI, VII, and VIII of the Periodic Table.

30. The process of Claim 28 wherein the congealed particle is substantially coated with calcium carbonate.

31. The process of Claim 18 wherein the average diameter of the congealed particles is about 0.1 to about 5 mm.

32. The process of Claim 18 wherein the concentration of congealed fraction in the slurry is about 1% to about 80% by weight.

33. The process of Claim 18 wherein the concentration of congealed fraction in the slurry is about 10% to about 50% by weight.

34. The process of Claim 18 wherein fractionation is effected by distillation and wherein at least a portion of the crude oil is cracked during the distillation.

35. The process of Claim 18 wherein the congealed particle is substantially spherical.

36. The process of Claim 18 wherein the average diameter of the congealed particle is about 0.1 to about 5 mm. and wherein the congealed particle is substantially spherical.

37. The process of Claim 18 wherein the slurry is transported in the conduit under substantially laminar flow condition.

38. The process of Claim 18 wherein the slurry is transported in the conduit under substantially transitional flow condition.

39. The process of Claim 18 wherein the slurry is transported in the conduit under substantially turbulent flow condition.

40. The process of Claim 18 wherein a liquid diluent miscible with the relatively low pour point fraction is admixed with the low pour point fraction before, during or after the slurrying of the congealed particles in the low pour point fraction.

References Cited
UNITED STATES PATENTS

| | | | |
|---|---|---|---|
| 3,425,429 | 2/1969 | Kane | 137—13 |
| 3,468,986 | 9/1969 | Watanabe | 264—9 |

HERBERT LEVINE, Primary Examiner

U.S. Cl. X.R.

137—13; 208—24, 37, 370; 302—66